United States Patent Office 3,652,724
Patented Mar. 28, 1972

3,652,724
PROCESS FOR PRODUCING BLOCK COPOLYMERS
Takatoshi Shimomura, Toyonaka-shi, and Ken-Ichi Kudo, Suita-shi, Japan, assignors to Sumitomo Chemical Company, Ltd., Osaka, Japan
No Drawing. Filed Feb. 16, 1970, Ser. No. 11,878
Claims priority, application Japan, Feb. 27, 1969, 44/15,081; May 26, 1969, 44/41,209
Int. Cl. C08f 29/12, 29/50, 33/08
U.S. Cl. 260—877                                              11 Claims

ABSTRACT OF THE DISCLOSURE

A block copolymer composed of a polymer block of an anionically polymerizable conjugated vinyl compound and a polymer block of a radically polymerizable monomer is produced by polymerizing a conjugated vinyl compound giving a stable carbanion, such as for example, a monovinyl aromatic compound, a vinylpyridine, a methacrylic acid ester, a vinylketone or a conjugated diene, in a solvent using as a catalyst an alkali metal, an organolithium compound or an aromatic hydrocarbon-alkali metal complex, thereby obtaining a living polymer and (1) treating the said living polymer with an azonitrile to synthesize a polymer having an azo group in the main chain and then thermally decomposing the resulting polymer in the presence of a radically polymerizable monomer such as, for example, an unsaturated halide, an allyl compound, acrylic acid, an acrylic acid ester, a vinyl compound, a diene or acrylamide, or (2) treating the above-mentioned living polymer with oxygen to synthesize a polymer having a hydroperoxy group at the polymer chain end and then subjecting the resulting polymer to thermal decomposition or redox decomposition in the presence of the above-mentioned radically polymerizable monomer, thereby polymerizing the said radically polymerizable monomer.

Block copolymers obtained according to the above-mentioned process are white powders and can be made into various molded and shaped articles by use of such thermoplastic resin-processing means as injection molding, compression molding, blow molding, fiber extrusion or film extrusion means.

This invention relates to a process for producing a block copolymer composed of a polymer block of an anionically polymerizable monomer and a polymer block of radically polymerizable monomer by (1) terminating a living polymer or copolymer with an azonitrile to obtain a polymer or a copolymer having an azo group in the polymer main chain, or (2) treating a living polymer or a copolymer with oxygen to obtain a polymer or a copolymer having a hydroperoxy group at the polymer chain end, and successively effecting the polymerization of a radically polymerizable monomer using the resulting polymer or copolymer as a radical initiator.

For the synthesis of block copolymers, there have heretofore been proposed various processes. In principle, these processes may be generally classified into those in which different monomers are sequentially polymerized by utilization of the reactive terminal of a polymer and those in which is effected the mutual reaction of the terminals or chain ends of different polymers.

From old times, attempts have been made to synthesize block copolymers by adding two or more monomers sequentially to the living anionic active chain end or co-ordination-anionic active chain end of a polymer and continuously effecting a polymerization reaction (anionic polymerization) according to a single propagation mechanism. However, it is difficult to expect, on one polymer chain, propagation reactions according to different mechanisms, and there have scarcely been known the cases where block copolymers were synthesized according to such alteration of polymerization mechanisms that an anionic polymerization was switched to a radical polymerization or a radical polymerization was switched to an anionic polymerization.

As the result of extensive studies, the present inventors have found a novel process for producing block copolymers, characterized in that the polymerization of a radically polymerizable monomer is effected using as a radical initiator a polymer synthesized in such a manner that a living polymer or copolymer (hereinafter referred to as "living polymer") having an alkali metal bonded to the polymer chain end is treated with (1) an azonitrile or (2) oxygen, i.e. a polymer of an anionically polymerizable monomer which has (1) an azo group in the main chain or (2) a hydroperoxy group at the chain end, and continuously effecting on one polymer chain propagation reactions according to different polymerization mechanisms.

The present invention provides a process for producing a block copolymer composed of an anionically polymerizable conjugated vinyl compound and a radically polymerizable monomer by effecting the polymerization of a radically polymerizable monomer using as a radical initiator (1) a macro-radical formed by treating a living polymer derived from a conjugated vinyl compound giving a stable carbanion with an azonitrile to synthesize a polymer having an azo group in the main chain and then subjecting the resulting polymer to thermal decomposition or (2) a macro-radical formed by treating the above-mentioned living polymer with oxygen to synthesize a polymer having a hydroperoxy group at the chain end and then subjecting the resulting polymer to thermal decomposition or redox decomposition.

A living polymer for forming the block copolymer in accordance with the present invention is obtained by polymerizing a conjugated vinyl compound giving a stable carbanion in a solvent using as a catalyst an alkali metal, an organo-lithium compound or an aromatic hydrocarbon-alkali metal complex. The living polymer obtained according to such a polymerization as mentioned above has an alkali ion bonded to the chain end, in general.

As the conjugated vinyl compound giving a stable carbanion which constitutes the living polymer, there may be used any compound of this kind so far as it is anionically polymerizable. Concrete examples of such conjugated vinyl compounds include monovinyl aromatic compounds such as styrene, α-methylstyrene, dimethylstyrene, vinyltoluene and vinylnaphthalene; vinylpyridines such as 2-vinylpyridine and 4-vinylpyridine; methacrylates and acrylates such as methyl methacrylate, ethyl methacrylate, methyl acrylate and ethyl acrylate; vinylketones such as phenylvinylketone and the like; and conjugated dienes such as butadiene and isoprene. When two or more of these conjugated vinyl compounds are suitably combined, a living copolymer can be prepared.

The living polymer is desirably prepared in the presence of a solvent. Examples of preferable solvents are ethers, benzene and derivatives thereof. Particularly preferable solvents are those which are high in polarity such as 1,2-dimethoxyethane, tetrahydrofuran, etc.

The above-mentioned conjugated vinyl compounds and solvents are required to be free, prior to polymerization reaction, from such impurities as reacting with alkali metals or carbanions. However, the presence of a small amount of impurities is not fatal, though the catalyst employed is consumed due to the presence thereof.

The polymerization temperature adopted in preparing the living polymer is ordinarily within the range from −80° C. to the boiling point of the solvent used. The chain length and molecular weight distribution of the living polymer can be optionally controlled by suitably selecting the weight ratio of catalyst to monomer or the polymerization temperature and the like polymerization conditions.

When the type of catalysts is suitably selected, it is possible to optionally synthesize one-ended living polymers and two-ended living polymers. For example, a one-ended living polymer can be synthesized by using as a catalyst an organometallic lithium or cumyl potassium, while a two-ended living polymer can be synthesized by using as a catalyst an alkali metal or an aromatic hydrocarbon-alkali metal complex.

Thus, living polymers rich in variations of constitutive monomers, degree of polymerization and molecular weight distributions can be obtained by selecting the types of conjugated vinyl compounds and catalysts, the weight ratios of catalysts to monomers and the polymerization conditions, and these give great influence to the physical properties of the resulting block copolymers.

The azonitriles employed in the process of the present invention, which react with living polymers having alkali metals at the chain ends to impart radical polymerization-initiating ability to said polymers, are represented by the following formulas:

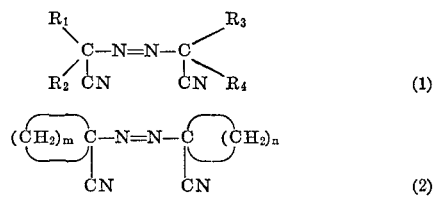

wherein $R_1$, $R_2$, $R_3$ and $R_4$ are individually an alkyl group having 1 to 10 carbon atoms, a cycloalkyl group having 3 to 10 carbon atoms, an aromatic nucleus-substituted phenyl group or an aromatic nucleus-substituted benzyl group, and $m$ and $n$ are individually an integer of to 10.

Concrete examples of the azonitriles used in the present invention include azobisisobutyronitrile, azobis-2-methylbutyronitrile, azobis-2-ethylbutyronitrile,, azobis-2-methylheptonitrile, 1 - azobis - 1 - cyclohexanecarbonitrile, etc., and the use of those which are less in activation energy in ordinary thermal decomposition reactions is more preferable.

These azonitriles react at their cyano groups which the living polymers but, in this case, the azo groups thereof do not undergo any change.

When a one-ended living polymer is reacted with the azonitrile, the degree of polymerization ordinarily becomes 2 times, while when a two-ended living polymer is reacted with the azonitrile, the degree of polymerization becomes 3 to several hundred times.

In reacting the living polymer with the azonitrile, the molar ratio of the two reactants is one of the important factors in the present invention, and has great influence on the ability of initiating the radical polymerization mentioned below and on the mechanical properties of the resulting block copolymer.

In reacting a one-ended living polymer with the azonitrile, the molar proportion of the azonitrile used to the one-ended living polymer is preferably 0.50–0.60, while in reacting a two-ended living polymer with the azonitrile, the molar proportion of the azonitrile used to the two-ended living polymer is preferably 1.00–1.20, and it is desirable that the azonitrile is used in slight excess of the equivalent.

In the above sense, the azonitrile may be said to be a coupling agent of living polymers, and the use of the azonitrile makes present on the polymer main chain one azo group in the case of a one-ended living polymer and 2 to several hundred azo groups in the case of a two-ended living polymer.

The reaction of living polymer with azonitrile is effected by adding the azonitrile to the polymerization medium immediately after completion of the living polymerization of conjugated vinyl compound. Since the reaction rate is extremely high, a reaction time is sufficiently several minutes to 30 minutes.

The temperature employed in the reaction of living polymer with azonitrile is preferably a temperature at which no decomposition of azo group takes place and at which a sufficiently high reaction rate can be maintained.

On the other hand, the polymeric radical initiator having a hydroperoxy group at the chain end which is used in the block copolymerization is obtained by treating a living polymer with oxygen at low temperature. The reaction of living polymer with oxygen is effected either by bubbling oxygen into the polymerization medium immediately after completion of the living polymerization of conjugated vinyl compound or by exposing the polymerization medium to oxygen atmosphere. In case the living polymer has its own characteristic color, the termination of the reaction can be easily judged by the disappearance of said color. Even in case where the living polymer is colorless, a reaction time of several minutes to 30 minutes is sufficient for the formation of terminal hydroperoxy group, since the rate of reaction thereof with oxygen is extremely high.

The reaction temperature for the formation of hydroperoxy group is preferably a low temperature at which no decomposition of hydroperoxy group takes place and at which a sufficiently high reaction rate can be maintained.

During the above-mentioned reactions, the polymer does not change at all in such microstructure as cis-1,4, trans-1,4 or vinyl linkage, but is desirably recovered as quickly as possible after completion of the reaction.

In case the polymer having (1) an azo group in the main chain or (2) a hydroperoxy group at the polymer chain end is present in the reaction medium, the solvent is evaporated and recovered to obtain a bulk polymer. Alternatively, the polymerization mixture after completion of the reaction may be charged with stirring into such a non-solvent as alcohol to precipitate a polymer and then the precipitated polymer may be dried. Particularly, unreacted azonitrile should completely be washed off by means of a suitable solvent.

In the present invention, the resulting polymer having (1) an azo group in the main chain or (2) a hydroperoxy group at the chain end is thermally decomposed to form a macroradical. Accordingly, when the thermal decomposition of the said polymer is effected in the presence of a radically polymerizable monomer, the copolymerization of the radically polymerizable monomer is initiated at the end of the said polymer to give a block copolymer composed of the polymer block of radically polymerizable monomer and the polymer block of conjugated vinyl compound which has been obtained by living polymerization. When the polymer having a hydroperoxy group at the polymer chain end is thermally decomposed, a hydroperoxy radical is also formed simultaneously, and therefore the by-production of a homopolymer of radically polymerizable monomer is unavoidable. Furthermore, in the case of the polymer having an azo group in the main chain, a homopolymer of radically polymerizable monomer is also by-produced. However, if the reaction conditions are suitably controlled, the by-production of the homopolymer of radically polymerizable monomer can be avoided.

When a polymer block of an anionically polymerizable conjugated vinyl compound is represented by A, and a polymer block of a radically polymerizable monomer is represented by B, a block copolymer of the structure A–B is produced from a living polymer having an alkali metal atom bonded to one end, while a block copolymer of the structure B–A–B is produced from a living polymer having alkali metal atoms bonded to both ends.

The radically polymerizable monomers used in the present invention may be any monomers so far as they are radically polymerizable. Concrete examples of these monomers include unsaturated halides represented by vinyl chloride and vinylidene chloride; allyl compounds represented by allylacetic acid, allyl alcohol, allyl chloride and methallylacetic acid; acrylic acids and acrylic acid esters represented by acrylic, methacrylic and α-chloroacrylic acids and methyl and ethyl esters thereof; unsaturated nitriles represented by acrylonitrile and methacrylonitrile; vinyl compounds represented by methylvinylketone and styrene; dienes represented by isoprene and butadiene; and, in addition thereto, maleic anhyride, diethyl maleate, ethylene, acrylamide, methacrylamide, N,N-diethyl acrylamide, diethylaminoethyl acrylate, etc.

The block copolymerization by thermal decomposition is most effectively carried out in an inert solvent in which no radical chain transfer takes place. Preferable as such solvents are hydrocarbons and halogenated hydrocarbons such as, for example, benzene, toluene, xylene, chlorobenzene, n-hexane, n-heptane and isooctane.

The block copolymerization in accordance with the present invention is preferably effected at a temperature of 60° C. to 150° C., and should be carried out at a temperature sufficient for the complete thermal decomposition of (1) the azo group present in the polymer main chain or (2) the hydroperoxy group present at the polymer chain end.

The time required for the polymerization is ordinarily from 1 to 50 hours.

According to the block copolymerization of the present invention, the polymer having (1) an azo group in the polymer main chain or (2) a hydroperoxy group at the polymer chain end ordinarily gives a block copolymer with block efficiency of 80% or more. Under optimum conditions, the said polymer can give a block copolymer with block efficiency of 100%.

Further, for the block copolymerization of the present invention using the polymer having a hydroperoxy group, there may be employed a redox decomposition in addition to the above-mentioned thermal decomposition.

The redox polymerization proceeds at a sufficiently high rate even at a low temperature to give quickly a copolymer high in degree of polymerization. Further, in the redox polymerization, no substantial chain transfer reaction or branching reaction takes place and, in most cases, a radical is formed exclusively at the polymer chain end, so that the by-production of a homopolymer of radically polymerizable monomer is not brought about. Thus, the redox polymerization has many advantages.

The block copolymerization reaction according to redox initiation may be conducted, in general, in any of an aqueous system or a non-aqueous system. However, it is desirable that the said reaction is carried out in an aromatic or aliphatic hydrocarbon capable of dissolving the polymer of anionically polymerizable monomer having a hydroperoxy group at the polymer chain end which is used as a radical initiator.

In the block copolymerization of the present invention, the polymer having a hydroperoxy group at the chain end acts as an oxidizing agent, and therefore a suitable reducing agent is required to be added to the reaction system. As the reducing agent, there is used a metal ion in a low valence state or an easily oxidizable substance containing no metal. Further, a composite redox system comprising a metal ion and a reducing agent is frequently used. Concrete examples of such reducing agents are heavy metal salts containing monovalent silver ions, divalent iron ions, trivalent titanium ions, etc., acid sulfites, sulfites, thiosulfates, mercaptans, sulfinic acids, amines, saccharides, composite systems containing benzoin and divalent or trivalent iron ions, and composite systems containing acid sulfites and divalent or trivalent iron ions.

In case the block copolymerization is carried out in a non-aqueous system, the use of an oil-soluble reducing agent is preferable.

The block copolymerization reaction may be effected also in an aqueous system. In this case, however, the use of a suitable emulsifier is necessary. Examples of such emulsifier include anionic surface active agents such as sulfates and alkylarylsulfonates of higher alcohols, and nonionic surface active agents such as alkyl ethers, alkyl esters and alkylaryl ethers of polyoxyethylenes.

The effect of the redox system is affected by a series of factors. Accordingly, in order to obtain certain optimum conditions, it is necessary to control carefully the amounts of individual components used in the redox reaction, i.e. the amounts of polymeric radical initiator as oxidizing agent, reducing agent, solvent and radically polymerizable monomer, and, in the case of an aqueous system, the amounts of water and emulsifier and the pH value of the system, in addition to the amounts of the above-mentioned components. The above-mentioned amounts cannot be immediately decided, but in both cases of aqueous system and non-aqueous system, the volume ratio of radically polymerizable monomer to dispersing medium (water or solvent) is variable within the range of 1/1 to 1/10, and the weight ratio of oxidizing agent to reducing agent is variable over such a wide range as from 100/1 to 1/100.

A trivalent iron ion formed by the redox reaction of the hydroperoxy group at the polymer chain end with a divalent iron ion is again reduced to the divalent iron ion by means of benzoin, acid sulfite or the like, and therefore the object of reduction can sufficiently be accomplished by use of an extremely small amount of reducing agent.

In the case of an aqueous system, the emulsifier is desirably used in an amount of 0.01–5 weight parts per 100 weight parts of the radically polymerizable monomer, and the pH value is preferably in the range of 2 to 6. However, in case the polymerization is to be effected at an alkaline condition, it is necessary to add a buffer agent such as sodium pyrophosphate or the like.

Redox polymerization is characteristically practicable at a low temperature. In the present invention also, the temperature employed in the block copolymerization is variable over such a wide range as from −50° C. to 80° C. Accordingly, in conducting the block copolymerization at a low temperature in an aqueous system, an antifreeze such as glycerine, ethylene glycol or the like should be used in an amount substantially equal to that of water.

The polymer obtained according to the present invention is recovered, in the case of a non-aqueous system, from such a non-solvent as alcohol or the like, while in the case of an aqueous system, it is separated from a latex by effecting coagulation using a common alcohol or salting out agent.

The separation of the block copolymer from the homopolymer of radically polymerizable monomer and polymers, which have not been able to initiate the radical polymerization, is not always necessary. However, in case only the block copolymer is required to be isolated, there is adopted such a procedure that a suitable extraction solvent is used to extract and recover only the block copolymer, or to extract and remove the latter two polymers and the block copolymer is recovered as an extraction residue.

According to the present process explained in the above, block copolymers composed of polymer sequences of anionically polymerizable monomers and polymer sequences of radically polymerizable monomers have come to be easily obtained, and polymers improved in processability and physical properties and novel polymers having such characteristics as not seen hitherto have come to be produced. Further, a characteristic of the present invention resides also in the point that it has become possible to conduct on one polymer main chain the alteration of propagation mechanisms of polymerization.

The block copolymers obtained in accordance with the present invention are white powders and can be processed into various molded and shaped articles by use of inspection molding, compression molding, blow molding, fiber extrusion, film extrusion and the like thermoplastic resin-processing means.

Further, the block copolymers obtained according to the present invention are usable also in the form of blends with known polymers. For example, blends of polystyrene block-containing block copolymers with polystyrene and blends of methyl methacrylate block-containing block copolymers with poly(methyl methacrylate) are usable as novel resins excellent in compatibility, and these blends have many such advantages as to improve the impact resistance of the polystyrenes and poly(methyl methacrylate).

The present invention is illustrated in further detail below with reference to examples, but the invention is not limited to these examples.

REFERENCE EXAMPLE 1

Synthesis of living polymer

Into a glass reactor were charged under a reduced pressure of below $10^{-2}$ mm. Hg, 18 ml. of a tetrahydrofuran solution of an $\alpha$-methylstyrene tetramer 2 sodium salt (Concentration; 0.33 mole/liter) and 750 ml. of tetrahydrofuran. To this solution was gradually added at room temperature with stirring by means of magnetic stirrer 103 ml. of styrene which had been dried over calcium hydride and then subjected to vacuum distillation. As the styrene was added, more or less heat was generated. and the apparent viscosity of the system increased with lapse of time. After 2 hours from initiation of the styrene polymerization, the styrene was completely consumed, and therefore the reaction was decided to have been completed.

In the above manner, there was obtained a polystyrene having a degree of polymerization of about 300 which had sodium cations bonded to the both chain ends. A part of the polymer solution was taken up and killed with methanol, and was then subjected to viscosity measurement to find that the intrinsic viscosity $[\eta]$ of the polymer was 1.62 dl./g. in dioxane at 25° C. and was 1.45 dl./g. in toluene at 25° C.

REFERENCE EXAMPLE 2

Synthesis of living polymer

Into a glass reactor were charged under a reduced pressure of below $10^{-2}$ mm. Hg, 39.8 ml. of tetrahydrofuran solution of $\alpha$-methylstyrene tetramer 2 sodium salt (Concentration; 0.3 mole/liter) and 700 ml. of tetrahydrofuran. To this solution was gradually added at room temperature with stirring by means of a magnetic stirrer 114 ml. of styrene which had been dried over calcium hydride and then subjected to vacuum distillation. As the styrene was added, more or less heat was generated, and the apparent viscosity of the system increased with lapse of time. After 3 hours from initiation of the styrene polymerization, the styrene was completely consumed, and therefore the reaction time was decided to have been completed.

In the above manner, there was obtained a tetrahydrofuran solution of polystyrene having a degree of polymerization of about 200 which had sodium cations bonded to the both chain ends.

EXAMPLE 1

Reaction of living polymer with azonitrile

To the living polystyrene synthesized according to Reference Example 1 was added at room temperature under a reduced pressure of $10^{-2}$ mm. Hg, a tetrahydrofuran solution of 2.8 g. of azobisisobutyronitrile (Na/CN=1.0/1.2)

Simultaneously with the addition of the azobisisobutyronitrile, the apparent viscosity of the system increased and the red color of the living polystyrene disappeared, whereby the whole system came to have a yellowish brown color. After 10 minutes, the reaction product was charged into a large amount of methanol, and polystyrene having an azo group in the main chain was recovered. The polystyrene was repeatedly subjected to methanol-washing in order to completely remove unreacted azobisisobutyronitrile, and was then dried at 30° C. under reduced pressure to obtain 99 g. of a white polymer.

The polystyrene obtained in this example was a polymer in which at least 2 of the polystyrene molecules synthesized in Reference Example 1 had been linked together by means of the azobisisobutyronitrile. The intrinsic viscosity $[\eta]$ of the polystyrene increased to 1.93 dl./g. in dioxane at 25° C. and increased to 1.80 dl./g. in toluene at 25° C.

The polystyrene obtained in this example was thermally decomposed in toluene at 100° C. and the toluene solution itself was subjected to viscosity measurement, whereby the intrinsic viscosity $[\eta]$ thereof decreased to 1.46 dl./g. This is considered ascribable to the fact that the polystyrene caused radical decomposition with removal of nitrogen to become the polystyrene of Reference Example 1.

EXAMPLE 2

Production of block copolymer

A mixture comprising 5 g. of the azobisisobutyronitrile-terminated polystyrene synthesized in Example 1 and 20.5 g. of methyl acrylate was charged into a four-necked flask equipped with a stirrer, a condenser, a thermometer and a nitrogen inlet, and was dissolved in 100 ml. of toluene. Subsequently, dry nitrogen was bubbled into the system for 30 minutes to exclude the oxygen present in the system. Thereafter, the flask was immersed in an oil bath and polymerization was continued at 98° C. for 9 hours under an atmosphere of nitrogen.

After completion of the reaction, the solvent and unreacted methyl acrylate were removed under reduced pressure to obtain 21 g. of a polymerization product. The crude product was treated with boiling ether for 5 hours to extract and remove 1.5 g. of the polystyrene. The extraction residue (19.5 g.) was a mixture of a block copolymer and a homopolymer of methyl acrylate. In order to remove the poly(methyl acrylate) from the mixture, a part of the mixture was dissolved in tetrahydrofuran and was subjected to hydrolysis reaction at 70° C. for 4 hours using an 8% aqueous sodium hydroxide solution, and the recovery of poly(acrylic acid) from the water-soluble portion was intended, but the amount of said polymer recovered was slight. It was therefore considered that substantially the whole quantity of the above-mentioned ether extraction residue was a block copolymer. The intrinsic viscosity $[\eta]$ of the resulting copolymer was 2.43 dl./g. in dioxane at 25° C.

Since 3.5 g. of the polystyrene (5 g.) used as the radical initiator formed the block copolymer, the initiation efficiency thereof was 70%.

EXAMPLE 3

In the same manner as in Example 2, 5.6 g. of the azobisisobutyronitrile-terminated polystyrene synthesized in Example 1 was dissolved in 100 ml. of toluene and was subjected to block copolymerization with 11.4 g. of methyl methacrylate at 100° C. for 10 hours.

After completion of the reaction, the same treatment as in Example 2 was effected to obtain 12.5 g. of a polymerization product. The crude product was treated with boiling ether for 5 hours to extract and remove 2.0 g. of polystyrene. The extraction residue (10.5 g.) was a mixture of a block copolymer and a poly(methyl) methacrylate). In order to remove the poly(methyl methacrylate) therefrom, a part of the residue was subjected to hydrolysis in the same manner as in Example 2, but the amount of water-soluble substance obtained was slight. The resulting ether-insoluble portion, which was considered to be a block copolymer, showed an intrinsic viscosity [$\eta$] of 2.11 dl./g. in dioxane at 25° C.

Since 3.6 g. of the polystyrene (5.6 g.) used as the radical initiator formed the block copolymer, the initiation efficiency thereof was 65%.

EXAMPLE 4

In the same manner as in Example 2, 5 g. of the azobisisobutyronitrile-terminated polystyrene synthesized in Example 1 was dissolved in 100 ml. of toluene and was subjected to block copolymerization with 9.2 g. of vinyl acetate at 98° C. for 9 hours.

After completion of the reaction, the same treatment as in Example 2 was effected to obtain 9.4 g. of a polymerization product. The crude product was treated with boiling methanol for 4 hours, and 0.9 g. of polyvinyl acetate was obtained from the methanol-soluble portion. The methanol-insoluble portion, which was a mixture of a block copolymer and polystyrene, was subjected, without separation of the polystyrene, to viscosity measurement to find that the intrinsic viscosity [$\eta$] of the mixture was 1.89 dl./g. in dioxane at 25° C.

EXAMPLE 5

In the same manner as in Reference Example 1, a two-ended living polymer of dimethylstyrene having a molecular weight of about 150,000 was synthesized in vacuum under such polymerization conditions as −78° C. and 21 hours. In the above synthesis reaction were used 1.84 ml. of a tetrahydrofuran solution of an $\alpha$-methylstyrene tetramer 2 sodium salt (concentration; 0.33 mole/liter) as an initiator, 500 ml. of tetrahydrofuran as a solvent, and 50 ml. of dimethylstyrene. To the polydimethylstyrene solution was added at −78° C. a tetrahydrofuran solution of 0.1 g. of azobisisobutyronitrile (Na/CN=1.0/2.0), and the mixture was reacted for 30 minutes until the red color of the living polymer had completely disappeared. After completion of the reaction, the reaction product was charged into a large amount of methanol to precipitate the polymeric material. The resulting azobisisobutyronitrile-terminated polydimethylstyrene was then dried at 30° C. under reduced pressure to obtain 42 g. of a white polymer.

40 g. of the resulting azobisisobutyronitrile-terminated polydimethylstyrene was charged into a 1 liter four-necked flask equipped with a stirrer, a condenser, a thermometer and a nitrogen inlet, and was dissolved in 700 ml. of toluene. To this solution was further added 68 ml. of n-butyl acrylate, and then dry nitrogen was bubbled into the system for 30 minutes to exclude the oxygen present therein. Thereafter, the flask was immersed in an oil bath, and block copolymerization was effected at 100° C. for 7 hours under an atmosphere of nitrogen.

After completion of the reaction, the reaction mixture was charged into a large amount of methanol, and a polymeric material was recovered and was dried at 60° C. under reduced pressure to obtain 55 g. of a block copolymer of dimethylstyrene and n-butyl acrylate. The intrinsic viscosity [$\eta$] of the thus obtained block copolymer was 1.97 dl./g. in toluene at 25° C.

EXAMPLE 6

Into a tetrahydrofuran solution of the living polystyrene synthesized in Reference Example 2 was gradually injected oxygen through a gas inlet pipe. Simultaneously with the injection of oxygen, the red color of the living polystyrene gradually disappeared and, after 5 minutes, the whole system became colorless and transparent. Immediately thereafter, the polymerization mixture was charged into a large amount of methanol, and a polystyrene having hydroperoxy groups at the both chain ends was recovered and was then dried at room temperature under reduced pressure to obtain 102 g. of a white polymer. The intrinsic viscosity [$\eta$] of the resulting polymer was 0.75 dl./g. in toluene at 25° C.

EXAMPLE 7

Into a four-necked flask equipped with a stirrer, a condenser, a thermometer and a nitrogen inlet was charged a mixture comprising 5 g. of the polystyrene having hydroperoxy groups at the both chain ends which had been synthesized in Example 6 and 20 ml. of methyl acrylate free from stabilizer, and the mixture was dissolved in 80 ml. of toluene. Subsequently, dry nitrogen was bubbled into the system for 30 minutes to exclude the oxygen present therein, and then the flask was immersed in an oil bath and polymerization was continued at 100° C. for 10 hours under an atmosphere of nitrogen.

After completion of the reaction, the solvent and unreacted methyl acrylate were removed under reduced pressure to obtain 18 g. of a polymerization product. The crude product was treated with boiling ether for 5 hours to extract and remove 0.8 g. of the polystyrene. The extraction residue (17.2 g.) was a mixture of a block copolymer and a homopolymer of methyl acrylate, and therefore the block efficiency was 84%. The intrinsic viscosity [$\eta$] of the product free from the polystyrene was 0.92 dl./g. in toluene at 25° C.

EXAMPLE 8

Into a four-necked flask equipped with a stirrer, a condenser, a thermometer and a nitrogen inlet was charged a mixture comprising 5 g. of the polystyrene having hydroperoxy groups at the both chain ends which had been synthesized in Example 6, 20 ml. of methyl acrylate free from stabilizer, 212 mg. of benzoin and 14.3 mg. of trivalent iron acetylacetonate, and the mixture was dissolved in 80 ml. of toluene. Subsequently, dry nitrogen was bubbled into the system to exclude the oxygen present therein, and then the flask was immersed in an oil bath and polymerization was continued at 40° C. for 20 hours under an atmosphere of nitrogen.

After completion of the reaction, the reaction mixture was charged into a large amount of methanol, and a precipitate recovered was then dried under reduced pressure to obtain 20 g. of a crude product. The crude product was treated with boiling ether for 5 hours to effect the extraction of polystyrene, but no polystyrene was substantially extracted. Accordingly, all the polystyrene used as the radical initiator had formed a block copolymer, and thus the block efficiency was 100%. In this example, no homopolymer of methyl acrylate had been by-produced. The intrinsic viscosity [$\eta$] of the block copolymer was 1.45 dl./g. in toluene at 25° C.

EXAMPLE 9

Into a four-necked flask equipped with a stirrer, a condenser, a thermometer and a nitrogen inlet was charged 5 g. of polystyrene having hydroperoxy groups at the both chain ends which had been synthesized in Example 6, and polystyrene was dissolved in 20 ml. of methyl acrylate free from stabilizer. To this solution was further added 80 ml. of distilled water which had been incorporated with 0.5 g. of sodium laurylbenzenesulfonate and 0.555 g. of $FeSO_4 \cdot 7H_2O$ and which had been adjusted to a pH of 4.5 by addition of concentrated sulfuric acid, and emulsion polymerization was effected at room temperature for 18 hours under an atmosphere of nitrogen.

After completion of the reaction, the reaction mixture was charged into a large amount of methanol, and a precipitate recovered was then dried under reduced pressure to obtain 12 g. of a polymerization product. The crude product was treated with boiling ether for 5 hours, whereby 1.5 g. of polystyrene was extracted, and therefore the block efficiency was 70%. In this example also, no homopolymer of methyl acrylate had been by-produced. The intrinsic viscosity of the thus obtained block copolymer was 0.95 dl./g. in toluene at 25° C.

What we claim is:

1. A process for producing block copolymers composed of polymer blocks of anionically polymerizable monomers and polymer blocks of radically polymerizable monomers, characterized in that a living polymer or copolymer having an alkali metal bonded to at least one end on the polymer chain and derived from a conjugated vinyl compound giving a stable carbanion is reacted with an azonitrile represented by the formula,

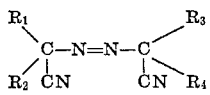

or

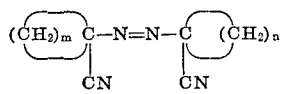

wherein $R_1$, $R_2$, $R_3$ and $R_4$ are individually an alkyl group having 1 to 10 carbon atoms, a cycloalkyl group having 3 to 10 carbon atoms, a phenyl group or a benzyl group, and $m$ and $n$ are individually an integer of 2 to 10, and the resulting polymer is subjected to thermal decomposition in the presence of a radically polymerizable monomer, thereby polymerizing the said radically polymerizable monomer.

2. A process according to claim 1, wherein the living polymer or copolymer is obtained by polymerizing at least one conjugated vinyl compound giving a stable carbanion in a solvent using as a catalyst an alkali metal, an organo-lithium compound or an aromatic hydrocarbon-alkali metal complex.

3. A process according to claim 2, wherein the conjugated vinyl compound is a monovinyl aromatic compound, a vinylpyridine, an acrylic acid ester, a methacrylic acid ester, a vinylketone or a conjugated diene, or a mixture thereof.

4. A process according to claim 1, wherein the azonitrile is azobisisobutyronitrile, azobis-2-methylbutyronitrile, azobis-2-ethylbutyronitrile, azobis-2-methylheptonitrile or 1-azobis-1-cyclohexanecarbonitrile.

5. A process according to claim 1, wherein the radically polymerizable monomer is an unsaturated halide, an allyl compound, acrylic acid, an acrylic acid ester, methacrylic acid, a methacrylic acid ester, an unsaturated nitrile, methylvinylketone, styrene, a diene, maleic anhydride, diethyl maleate, ethylene, acrylamide, methacrylamide, N,N-diethyl acrylamide or diethylaminoethyl acrylate.

6. A process according to claim 1, wherein the azonitrile is used in an amount of 0.50 to 0.60 mole per mole of the one-ended living polymer or copolymer.

7. A process according to claim 1, wherein the azonitrile is used in an amount of 1.00 to 1.20 moles per mole of the two-ended living polymer or copolymer.

8. A process according to claim 1, wherein the polymerization of the radically polymerizable monomer is effected in an inert solvent causing no radical chain transfer.

9. A process according to claim 8, wherein the inert solvent is benzene, toluene, xylene, chlorobenzene, n-hexane or isooctane.

10. A process according to claim 1, wherein the polymerization of the radically polymerizable monomer is effected at a temperature of 60° to 150° C.

11. A process for producing block copolymers composed of polymer blocks of anionically polymerizable monomers and polymer blocks of radically polymerizable monomers, characterized in that the polymerization of the radically polymerizable monomer is effected by use of, as a radical initiator, a polymer composition formed by terminating a living polymer or copolymer having an alkali metal bonded to at least one end on the polymer chain and derived from a conjugated vinyl compound giving a stable carbanion with an azonitrile represented by the formula,

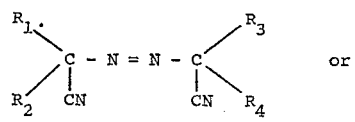 or

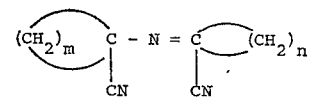

wherein $R_1$, $R_2$, $R_3$ and $R_4$ are individually an alkyl group having 1 to 10 carbon atoms, a cycloalkyl group having 3 to 10 carbon atoms, a phenyl group or a benzyl group, and $m$ and $n$ are individually an integer of 2 to 10, the resulting polymer being subjected to thermal decomposition in the presence of a radically polymerizable monomer.

References Cited

UNITED STATES PATENTS

| | | | |
|---|---|---|---|
| 3,135,716 | 6/1964 | Uraneck et al. | 260—880 |
| 3,492,369 | 1/1970 | Naylor | 260—877 |
| 3,511,894 | 5/1970 | Markert | 260—877 |

OTHER REFERENCES

Greber, German application 1,225,863, printed Sept. 29, 1966.

SAMUEL H. BLECH, Primary Examiner

U.S. Cl. X.R.

260—63 K, 88.3 R, 89.5 S, 93.5 A, 94.7 A, 94.7 N, 875, 876 B, 878 B, 879, 880 B, 881, 884, 885, 886